(12) United States Patent
Pino et al.

(10) Patent No.: US 10,002,125 B2
(45) Date of Patent: Jun. 19, 2018

(54) LANGUAGE MODEL PERSONALIZATION

(71) Applicant: Facebook, Inc., Menlo Park, CA (US)

(72) Inventors: Juan Miguel Pino, Cambridge (GB);
Ying Zhang, Turlock, CA (US);
Matthias Gerhard Eck, Mountain View, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days. days.

(21) Appl. No.: 14/980,654

(22) Filed: Dec. 28, 2015

(65) Prior Publication Data

US 2017/0185583 A1    Jun. 29, 2017

(51) Int. Cl.
*G06F 17/28* (2006.01)
*G06F 17/27* (2006.01)
(Continued)

(52) U.S. Cl.
CPC ...... *G06F 17/2735* (2013.01); *G06F 17/2775* (2013.01); *G06F 17/2836* (2013.01); *G06N 7/005* (2013.01); *G06N 99/005* (2013.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/2795; G06F 17/28; G06F 17/2809; G06F 17/2818; G06F 17/2827; G06F 17/2836; G06F 17/2845; G06F 17/2854; G06F 17/2863; G06F 17/2872; G06F 17/289; G06F 17/2881
(Continued)

(56) References Cited

U.S. PATENT DOCUMENTS 5,293,581 A    3/1994  DiMarco et al.
5,477,451 A   12/1995  Brown et al.
(Continued)

OTHER PUBLICATIONS

Non-Final Office Action dated Dec. 17, 2015, for U.S. Appl. No. 14/302,032 of Saint Cyr, L., filed Jun. 11, 2014.
(Continued)

*Primary Examiner* — Lamont Spooner

(57) ABSTRACT

Specialized language processing engines can use author-specific or reader-specific language models to improve language processing results by selecting phrases most likely to be used by an author or by tailoring output to language with which the reader is familiar. Language models that are author-specific can be generated by identifying characteristics of an author or author type such as age, gender, and location. An author-specific language model can be built using, as training data, language items written by users with the identified characteristics. Language models that are reader-specific can be generated using, as training data, language items written by or viewed by that reader. When implementing a specialized machine translation engine, multiple possible translations can be generated. An author-specific language model or a reader-specific language model can provide scores for possible translations, which can be used to select the best translation.

19 Claims, 6 Drawing Sheets

(51) Int. Cl.
*G06N 7/00* (2006.01)
*G06N 99/00* (2010.01)

(58) Field of Classification Search
USPC .................................................. 704/1–10
See application file for complete search history.

(56) References Cited

U.S. PATENT DOCUMENTS

| | | | |
|---|---|---|---|
| 5,510,981 | A | 4/1996 | Berger et al. |
| 5,799,193 | A * | 8/1998 | Sherman ............... G06F 8/24 715/967 |
| 5,991,710 | A | 11/1999 | Papineni et al. |
| 6,002,998 | A | 12/1999 | Martino et al. |
| 6,157,905 | A | 12/2000 | Powell |
| 6,161,082 | A | 12/2000 | Goldberg |
| 6,223,150 | B1 | 4/2001 | Duan et al. |
| 6,266,642 | B1 | 7/2001 | Franz et al. |
| 6,304,841 | B1 | 10/2001 | Berger et al. |
| 6,377,925 | B1 | 4/2002 | Newman et al. |
| 6,393,389 | B1 | 5/2002 | Chanod et al. |
| 6,629,095 | B1 | 9/2003 | Wagstaff et al. |
| 7,054,804 | B2 | 5/2006 | Gonzales et al. |
| 7,110,938 | B1 | 9/2006 | Cheng et al. |
| 7,359,861 | B2 | 4/2008 | Lee et al. |
| 7,533,019 | B1 * | 5/2009 | Hakkani-Tur ....... G10L 15/065 704/244 |
| 7,664,629 | B2 * | 2/2010 | Dymetman ........... G06F 17/274 704/2 |
| 7,813,918 | B2 | 10/2010 | Muslea et al. |
| 7,827,026 | B2 | 11/2010 | Brun et al. |
| 7,895,030 | B2 | 2/2011 | Al-Onaizan et al. |
| 7,983,903 | B2 | 7/2011 | Gao et al. |
| 8,015,140 | B2 | 9/2011 | Kumar et al. |
| 8,145,484 | B2 | 3/2012 | Zweig et al. |
| 8,175,244 | B1 | 5/2012 | Frankel et al. |
| 8,204,739 | B2 | 6/2012 | Lane et al. |
| 8,209,333 | B2 | 6/2012 | Hubbard et al. |
| 8,265,923 | B2 | 9/2012 | Chatterjee et al. |
| 8,275,602 | B2 | 9/2012 | Curry et al. |
| 8,386,235 | B2 | 2/2013 | Duan et al. |
| 8,543,580 | B2 | 9/2013 | Chen et al. |
| 8,756,050 | B1 | 6/2014 | Curtis et al. |
| 8,825,466 | B1 | 9/2014 | Wang et al. |
| 8,825,759 | B1 | 9/2014 | Ho et al. |
| 8,831,928 | B2 | 9/2014 | Marcu et al. |
| 8,838,434 | B1 | 9/2014 | Liu |
| 8,874,429 | B1 | 10/2014 | Crosley et al. |
| 8,897,423 | B2 | 11/2014 | Nanjundaswamy |
| 8,935,150 | B2 | 1/2015 | Christ |
| 8,942,973 | B2 | 1/2015 | Viswanathan |
| 8,949,865 | B1 | 2/2015 | Murugesan et al. |
| 8,983,974 | B1 | 3/2015 | Ho et al. |
| 8,990,068 | B2 | 3/2015 | Orsini |
| 8,996,352 | B2 | 3/2015 | Orsini |
| 8,996,353 | B2 | 3/2015 | Orsini |
| 8,996,355 | B2 | 3/2015 | Orsini |
| 9,009,025 | B1 | 4/2015 | Porter et al. |
| 9,031,829 | B2 | 5/2015 | Leydon |
| 9,104,661 | B1 | 8/2015 | Evans |
| 9,183,309 | B2 | 11/2015 | Gupta |
| 9,231,898 | B2 | 1/2016 | Orsini |
| 9,245,278 | B2 | 1/2016 | Orsini |
| 9,336,206 | B1 | 5/2016 | Orsini |
| 9,477,652 | B2 | 10/2016 | Huang et al. |
| 9,734,142 | B2 | 8/2017 | Huang et al. |
| 9,734,143 | B2 | 8/2017 | Rottmann et al. |
| 9,740,687 | B2 | 8/2017 | Herdagdelen et al. |
| 9,747,283 | B2 | 8/2017 | Rottmann et al. |
| 9,805,029 | B2 | 10/2017 | Rottmann et al. |
| 9,830,386 | B2 | 11/2017 | Huang et al. |
| 9,830,404 | B2 | 11/2017 | Huang et al. |
| 2002/0087301 | A1 | 7/2002 | Jones et al. |
| 2002/0161579 | A1 | 10/2002 | Saindon et al. |
| 2002/0169592 | A1 | 11/2002 | Aityan |
| 2003/0040900 | A1 | 2/2003 | D'Agostini et al. |
| 2004/0002848 | A1 | 1/2004 | Zhou et al. |
| 2004/0049374 | A1 | 3/2004 | Breslau et al. |
| 2004/0098247 | A1 | 5/2004 | Moore |
| 2004/0122656 | A1 | 6/2004 | Abir et al. |
| 2004/0243392 | A1 | 12/2004 | Chino et al. |
| 2005/0021323 | A1 | 1/2005 | Li et al. |
| 2005/0055630 | A1 | 3/2005 | Scanlan et al. |
| 2005/0228640 | A1 | 10/2005 | Aue et al. |
| 2006/0111891 | A1 | 5/2006 | Menezes et al. |
| 2006/0206798 | A1 | 9/2006 | Kohlmeier et al. |
| 2006/0271352 | A1 | 11/2006 | Nikitin et al. |
| 2007/0130563 | A1 | 6/2007 | Elgazzar et al. |
| 2007/0136222 | A1 | 6/2007 | Horvitz et al. |
| 2008/0046231 | A1 * | 2/2008 | Laden ................... G06F 17/248 704/8 |
| 2008/0077384 | A1 | 3/2008 | Agapi et al. |
| 2008/0281578 | A1 | 11/2008 | Kumaran et al. |
| 2009/0070095 | A1 | 3/2009 | Gao et al. |
| 2009/0083023 | A1 | 3/2009 | Foster et al. |
| 2009/0132233 | A1 | 5/2009 | Etzioni et al. |
| 2009/0182547 | A1 | 7/2009 | Niu et al. |
| 2009/0198487 | A1 | 8/2009 | Wong et al. |
| 2009/0210214 | A1 | 8/2009 | Qian et al. |
| 2009/0276206 | A1 | 11/2009 | Fitzpatrick et al. |
| 2009/0281789 | A1 | 11/2009 | Waibel et al. |
| 2009/0326912 | A1 | 12/2009 | Ueffing et al. |
| 2010/0042928 | A1 | 2/2010 | Rinearson et al. |
| 2010/0121639 | A1 | 5/2010 | Zweig et al. |
| 2010/0149803 | A1 | 6/2010 | Nakano et al. |
| 2010/0161642 | A1 | 6/2010 | Chen et al. |
| 2010/0194979 | A1 | 8/2010 | Blumenschein et al. |
| 2010/0223048 | A1 | 9/2010 | Lauder et al. |
| 2010/0228777 | A1 | 9/2010 | Imig et al. |
| 2010/0241416 | A1 | 9/2010 | Jiang et al. |
| 2010/0283829 | A1 | 11/2010 | De Beer et al. |
| 2010/0299132 | A1 | 11/2010 | Dolan et al. |
| 2011/0099000 | A1 | 4/2011 | Rai et al. |
| 2011/0137636 | A1 | 6/2011 | Srihari et al. |
| 2011/0246172 | A1 | 10/2011 | Liberman et al. |
| 2011/0246881 | A1 | 10/2011 | Kushman et al. |
| 2011/0252027 | A1 * | 10/2011 | Chen ................ G06F 17/30525 707/728 |
| 2011/0282648 | A1 * | 11/2011 | Sarikaya ............ G06F 17/2818 704/7 |
| 2012/0005224 | A1 * | 1/2012 | Ahrens ................... G06Q 10/10 707/769 |
| 2012/0029910 | A1 | 2/2012 | Medlock et al. |
| 2012/0035907 | A1 | 2/2012 | Lebeau et al. |
| 2012/0035915 | A1 | 2/2012 | Kitade et al. |
| 2012/0047172 | A1 | 2/2012 | Ponte et al. |
| 2012/0059653 | A1 * | 3/2012 | Adams ..................... G10L 15/19 704/243 |
| 2012/0101804 | A1 | 4/2012 | Roth et al. |
| 2012/0109649 | A1 | 5/2012 | Talwar |
| 2012/0123765 | A1 | 5/2012 | Estelle et al. |
| 2012/0130940 | A1 * | 5/2012 | Gattani ............. G06F 17/30592 707/600 |
| 2012/0138211 | A1 | 6/2012 | Barger et al. |
| 2012/0158621 | A1 | 6/2012 | Bennett et al. |
| 2012/0173224 | A1 | 7/2012 | Anisimovich et al. |
| 2012/0209588 | A1 | 8/2012 | Wu et al. |
| 2012/0253785 | A1 | 10/2012 | Hamid et al. |
| 2012/0330643 | A1 | 12/2012 | Frei et al. |
| 2013/0018650 | A1 | 1/2013 | Moore et al. |
| 2013/0060769 | A1 | 3/2013 | Pereg et al. |
| 2013/0084976 | A1 | 4/2013 | Kumaran et al. |
| 2013/0103384 | A1 | 4/2013 | Hunter et al. |
| 2013/0144595 | A1 * | 6/2013 | Lord ..................... G06F 17/289 704/2 |
| 2013/0144603 | A1 * | 6/2013 | Lord ..................... H04L 12/1831 704/9 |
| 2013/0144619 | A1 * | 6/2013 | Lord ..................... G06F 3/165 704/235 |
| 2013/0173247 | A1 | 7/2013 | Hodson et al. |
| 2013/0246063 | A1 | 9/2013 | Teller et al. |
| 2013/0317808 | A1 | 11/2013 | Kruel et al. |
| 2014/0006003 | A1 | 1/2014 | Soricut et al. |
| 2014/0006929 | A1 | 1/2014 | Swartz et al. |

(56) References Cited

U.S. PATENT DOCUMENTS

| | | |
|---|---|---|
| 2014/0012568 A1* | 1/2014 | Caskey .................. G06F 17/276 704/9 |
| 2014/0025734 A1 | 1/2014 | Griffin et al. |
| 2014/0059030 A1 | 2/2014 | Hakkani-Tur et al. |
| 2014/0081619 A1 | 3/2014 | Solntseva et al. |
| 2014/0108393 A1 | 4/2014 | Angwin et al. |
| 2014/0163977 A1* | 6/2014 | Hoffmeister ............ G10L 15/32 704/232 |
| 2014/0172413 A1 | 6/2014 | Cvijetic et al. |
| 2014/0195884 A1 | 7/2014 | Castelli et al. |
| 2014/0207439 A1 | 7/2014 | Venkatapathy et al. |
| 2014/0229155 A1 | 8/2014 | Leydon et al. |
| 2014/0279996 A1 | 9/2014 | Teevan et al. |
| 2014/0280295 A1 | 9/2014 | Kurochkin et al. |
| 2014/0280592 A1 | 9/2014 | Zafarani et al. |
| 2014/0288913 A1* | 9/2014 | Shen ..................... G06F 17/289 704/2 |
| 2014/0288917 A1 | 9/2014 | Orsini et al. |
| 2014/0288918 A1 | 9/2014 | Orsini et al. |
| 2014/0303960 A1 | 10/2014 | Orsini et al. |
| 2014/0335483 A1 | 11/2014 | Buryak et al. |
| 2014/0337007 A1 | 11/2014 | Fuegen et al. |
| 2014/0337989 A1 | 11/2014 | Bojja et al. |
| 2014/0350916 A1 | 11/2014 | Jagpal et al. |
| 2014/0358519 A1 | 12/2014 | Dymetman et al. |
| 2014/0365200 A1 | 12/2014 | Sagie |
| 2014/0365460 A1 | 12/2014 | Portnoy et al. |
| 2015/0006143 A1* | 1/2015 | Skiba .................... G06F 17/271 704/2 |
| 2015/0006219 A1 | 1/2015 | Jose et al. |
| 2015/0033116 A1 | 1/2015 | Severdia et al. |
| 2015/0046146 A1 | 2/2015 | Crosley et al. |
| 2015/0066805 A1 | 3/2015 | Taira et al. |
| 2015/0120290 A1* | 4/2015 | Shagalov ............. G10L 15/083 704/231 |
| 2015/0134322 A1 | 5/2015 | Cuthbert et al. |
| 2015/0142420 A1 | 5/2015 | Sarikaya et al. |
| 2015/0161104 A1 | 6/2015 | Buryak et al. |
| 2015/0161110 A1* | 6/2015 | Salz ..................... G06F 17/289 704/3 |
| 2015/0161112 A1 | 6/2015 | Galvez et al. |
| 2015/0161114 A1 | 6/2015 | Buryak et al. |
| 2015/0161115 A1 | 6/2015 | Denero et al. |
| 2015/0161227 A1 | 6/2015 | Buryak et al. |
| 2015/0213008 A1 | 7/2015 | Orsini |
| 2015/0228279 A1* | 8/2015 | Biadsy ................... G10L 15/26 704/235 |
| 2015/0293997 A1 | 10/2015 | Smith et al. |
| 2015/0363388 A1* | 12/2015 | Herdagdelen ........... G06F 17/28 704/2 |
| 2016/0041986 A1 | 2/2016 | Nguyen |
| 2016/0048505 A1 | 2/2016 | Tian et al. |
| 2016/0092603 A1* | 3/2016 | Rezaei ................. G06F 17/3043 707/736 |
| 2016/0117628 A1 | 4/2016 | Brophy et al. |
| 2016/0162473 A1 | 6/2016 | Hedley et al. |
| 2016/0162477 A1 | 6/2016 | Orsini |
| 2016/0162478 A1 | 6/2016 | Blassin et al. |
| 2016/0162575 A1 | 6/2016 | Eck |
| 2016/0177628 A1 | 6/2016 | Juvani |
| 2016/0188575 A1 | 6/2016 | Sawaf |
| 2016/0188576 A1 | 6/2016 | Huang |
| 2016/0188661 A1 | 6/2016 | Zhang et al. |
| 2016/0188703 A1 | 6/2016 | Zhang et al. |
| 2016/0217124 A1* | 7/2016 | Sarikaya ............. G06F 17/2765 |
| 2016/0239476 A1 | 8/2016 | Huang |
| 2016/0267073 A1 | 9/2016 | Noeman et al. |
| 2016/0299884 A1* | 10/2016 | Chioasca ............ G06F 17/2705 |
| 2016/0357519 A1 | 12/2016 | Vargas et al. |
| 2017/0011739 A1 | 1/2017 | Huang et al. |
| 2017/0083504 A1 | 3/2017 | Huang |
| 2017/0169015 A1 | 6/2017 | Huang |
| 2017/0177564 A1 | 6/2017 | Rottmann et al. |
| 2017/0185586 A1 | 6/2017 | Rottmann et al. |
| 2017/0185588 A1 | 6/2017 | Rottmann et al. |
| 2017/0270102 A1 | 9/2017 | Herdagdelen et al. |
| 2017/0315988 A1 | 11/2017 | Herdagdelen et al. |
| 2017/0315991 A1 | 11/2017 | Rottmann et al. |

OTHER PUBLICATIONS

U.S. Appl. No. 14/302,032 of Herdagdelen, A et al., filed Jun. 11, 2014.

U.S. Appl. No. 14/559,540 of Eck, M et al., filed Dec. 3, 2014.

U.S. Appl. No. 14/586,022 of Huang, F. et al., filed Dec. 30, 2014.

U.S. Appl. No. 14/621,921 of Huang, F., filed Feb. 13, 2015.

U.S. Appl. No. 14/967,897 of Huang F. et al., filed Dec. 14, 2015.

Final Office Action dated Jul. 1, 2016, for U.S. Appl. No. 14/302,032 of Herdagdelen, A., filed Jun. 11, 2014.

Non-Final Office Action dated Mar. 10, 2016, for U.S. Appl. No. 14/621,921 of Huang, F., filed Feb. 13, 2015.

Notice of Allowance dated Jul. 18, 2016, for U.S. Appl. No. 14/621,921 of Huang, F., filed Feb. 13, 2015.

U.S. Appl. No. 15/199,890 of Zhang, Y. et al., filed Jun. 30, 2016.

U.S. Appl. No. 15/244,179 of Zhang, Y., et al., filed Aug. 23, 2016.

Final Office Action dated Jun. 16, 2017, for U.S. Appl. No. 14/586,022 of Huang, F. et al., filed Dec. 30, 2014.

Notice of Allowance dated Jun. 6, 2017, for U.S. Appl. No. 14/981,794 by Rottman, K., et al., filed Dec. 28, 2015.

Non-Final Office Action dated Jun. 26, 2017, for U.S. Appl. No. 15/445,978 of Herdagdelen, A., filed Feb. 28, 2017.

Zamora, J.D., et al., "Tweets language identification using feature weightings," Proceedings of the Twitter language identification workshop, Sep. 16, 2014, 5 pages.

Extended European Search Report for European Application No. 16161095.1, dated Feb. 16, 2017, 4 pages.

U.S. Appl. No. 15/644,690 of Huang, F. et al., filed Jul. 7, 2017.

Notice of Allowance dated Jul. 12, 2017, for U.S. Appl. No. 14/981,794 by Rottman, K., et al., filed Dec. 28, 2015.

Supplemental Notice of Allowability dated Jul. 13, 2017, for U.S. Appl. No. 14/981,769 by Rottmann, K., et al., filed Dec. 28, 2015.

Corrected Notice of Allowability dated Jul. 13, 2017, for U.S. Appl. No. 14/973,387 of Rottmann, K., et al., filed Dec. 17, 2015.

International Search Report and Written Opinion for International Application No. PCT/USZ015/051737, dated Jul. 28, 2016, 22 pages.

Koehn, P. et al., "Statistical Phrase-Based Translation,"Proceedings of the 2003 Conference of the North American Chapter of the Association for computational Linguistics on Human Language Technolog13 Volume 1, Assoc. for Computational Linguistics, 2003, pp. 48-54

Non-Final Office Action dated Dec. 29, 2016, for U.S. Appl. No. 14/586,049 of Huang, F. et al., filed Dec. 30, 2014.

Non-Final Office Action dated Dec. 30, 2016 in U.S. Appl. No. 14/586,074 by Huang, F. et al., filed Dec. 30, 2014.

Non-Final Office Action dated Jul. 28, 2016, for U.S. Appl. No. 14/861,747 of F. Huang, filed Sep. 22, 2015.

Non-Final Office Action dated Nov. 9, 2016 for U.S. Appl. No. 14/973,387 by Rottmann, K., et al., filed Dec. 17, 2015.

Non-Final Office Action dated Oct. 6, 2016, U.S. Appl. No. 14/981,794 of Rottmann, K., filed Dec. 28, 2015.

Notice of Allowance dated Apr. 13, 2017, for U.S. Appl. No. 14/973,387 of Rottmann, K., et al., filed Dec. 17, 2015.

Notice of Allowance dated Apr. 19, 2017, for U.S. Appl. No. 14/981,769 by Rottmann, K., et al., filed Dec. 28, 2015.

Notice of Allowance dated Apr. 20, 2017 for U.S. Appl. No. 14/302,032 by Herdagdelen, A., et al., filed Jun. 11, 2014.

Notice of Allowance dated Apr. 7, 2017 for U.S. Appl. No. 14/861,747 by Huang, F., et al., filed Sep. 22, 2015.

Notice of Allowance dated Mar. 1, 2017, for U.S. Appl. No. 14/981,769 by Rottmann, K., et al., filed Dec. 28, 2015.

Sutskever, I., et al., "Sequence to sequence learning with neural networks," Advances in Neural Information Processing Systems, pp. 3104-3112, 2014.

U.S. Appl. No. 14/586,049, by Huang et al., filed Dec. 30, 2014.

U.S. Appl. No. 14/586,074 by Huang et al., filed Dec. 30, 2014.

(56) References Cited

OTHER PUBLICATIONS

U.S. Appl. No. 14/861,747 by Huang, F., filed Sep. 22, 2015.
U.S. Appl. No. 14/973,387, of Rottmann, K., et al., filed Dec. 17, 2015.
U.S. Appl. No. 14/981,769 by Rottmann, K., et al., filed Dec. 28, 2015.
U.S. Appl. No. 14/981,794 by Rottmann, K., et al., filed Dec. 28, 2015.
U.S. Appl. No. 15/445,978 by Herdagdelen, A., et al., filed Feb. 28, 2017.
Vogel, S. et al., "HMM-Based Word Alignment in Statistical Translation." In Proceedings of the 16th Conference on Computational Linguistics—vol. 2, Association for Computational Linguistics, 1996, pp. 836-841.
Non-Final Office Action dated Dec. 21, 2016, for U.S. Appl. No. 14/586,022 of Huang, F., filed Dec. 30, 2014.
Non-Final Office Action dated Jan. 12, 2017, for U.S. Appl. No. 15/275,235 of Huang, F. et al., filed Sep. 23, 2016.
Notice of Allowance dated Nov. 30, 2016, for U.S. Appl. No. 14/302,032 of Herdagdelen, A., filed Jun. 11, 2014.
U.S. Appl. No. 15/275,235 of Huang, F. et al., filed Sep. 23, 2016.
Non-Final Office Action dated Feb. 9, 2017, for U.S. Appl. No. 14/559,540 of Eck, M. et al., filed Dec. 3, 2014.
Final Office Action dated Sep. 8, 2017 for U.S. Appl. No. 15/445,978 of Herdagdelen, A. filed Feb. 28, 2017.
Notice of Allowability dated Sep. 12, 2017 for U.S. Appl. No. 14/981,794 by Rottman, K., et al., filed Dec. 28, 2015.
Notice of Allowability dated Sep. 19, 2017 for U.S. Appl. No. 14/559,540 by Eck, M. et al. filed Dec. 3, 2014.
Notice of Allowance dated Oct. 10, 2017 for U.S. Appl. No. 15/275,235 for Huang, F. et al., filed Sep. 23, 2016.
Notice of Allowance dated Oct. 23, 2017 for U.S. Appl. No. 15/445,978 of Herdagdelen, A. filed Feb. 28, 2017.
U.S. Appl. No. 15/723,095 of Tiwari, P. filed Oct. 2, 2017.
Corrected Notice of Allowability dated Nov. 17, 2017, for U.S. Appl. No. 14/559,540 of Eck, M. et al., filed Dec. 3, 2014.
Notice of Allowance dated Dec. 8, 2017 for U.S. Appl. No. 15/652,175 by Herdagdelen, A., filed Jul. 17, 2017.
Corrected Notice of Allowability dated Dec. 12, 2017, for U.S. Appl. No. 14/559,540 of Eck, M. et al., filed Dec. 3, 2014.
U.S. Appl. No. 15/820,351 by Huang et al., filed Nov. 21, 2017.
U.S. Appl. No. 15/821,167 by Huang et al., filed Nov. 22, 2017.
Final Office Action dated Aug. 10, 2017 for U.S. Appl. No. 15/275,235 by Huang, F. et al. filed Sep. 23, 2016.
Non-Final Office Action dated Aug. 25, 2017 for U.S. Appl. No. 15/652,175 by Herdagdelen, A., filed Jul. 17, 2017.
Non-Final Office Action dated Aug. 29, 2017 for U.S. Appl. No. 14/967,897 by Huang, F., filed Dec. 14, 2015.
Notice of Allowance dated Aug. 30, 2017 for U.S. Appl. No. 14/559,540 by Eck, M. et al. filed Dec. 3, 2014.
Notice of Allowance dated Aug. 4, 2017, for U.S. Appl. No. 14/981,794 by Rottman, K., et al., filed Dec. 28, 2015.
Notice of Allowance dated Jul. 26, 2017, for U.S. Appl. No. 14/586,074 by Huang, F., et al., filed Dec. 30, 2014.
Notice of Allowance dated Jul. 28, 2017, for U.S. Appl. No. 14/586,049 by Huang, F., et al., filed Dec. 30, 2014.
U.S. Appl. No. 15/652,144 of Rottmann, K., filed Jul. 17, 2017.
U.S. Appl. No. 15/654,668 of Rottmann, K., filed Jul. 19, 2017.
U.S. Appl. No. 15/672,690 of Huang, F., filed Aug. 9, 2017.
U.S. Appl. No. 15/696,121 of Rottmann, K. et al., filed Sep. 5, 2017.

* cited by examiner

LANGUAGE MODEL PERSONALIZATION

BACKGROUND

The Internet has made it possible for people to globally connect and share information in ways previously undreamt of. Social media platforms, for example, enable people on opposite sides of the world to collaborate on ideas, discuss current events, or just share what they had for lunch. In the past, this spectacular resource has been somewhat limited to communications between users having a common natural language ("language"). In addition, users have only been able to consume content that is in their language, or for which a content provider is able to determine an appropriate translation.

While communication across the many different natural languages used around the world is a particular challenge, several machine translation engines have attempted to address this concern. Machine translation engines enable a user to select or provide a content item (e.g., a message from an acquaintance) and quickly receive a translation of the content item. In some cases machine translation engines can include one or more "translation models" and one or more "language models." Creating a translation model can use training data that includes identical or similar content in both a source and an output language to generate mappings of words or phrases in a source language to words or phrases in an output language. Creating a language model can use training data that includes a corpus of data in the output language to generate probability distributions of words or phrases that are likely to go together in the output language.

Machine translation engine training data is often obtained from news reports, parliament domains, educational "wiki" sources, etc. In many cases, the source of training data that is used to create a machine translation engine is from a considerably different domain than the content on which that machine translation engine is used for translations. For example, content in the social media domain often includes slang terms, colloquial expressions, spelling errors, incorrect diacritical marks, and other features not common in carefully edited news sources, parliament documents, or educational wiki sources.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
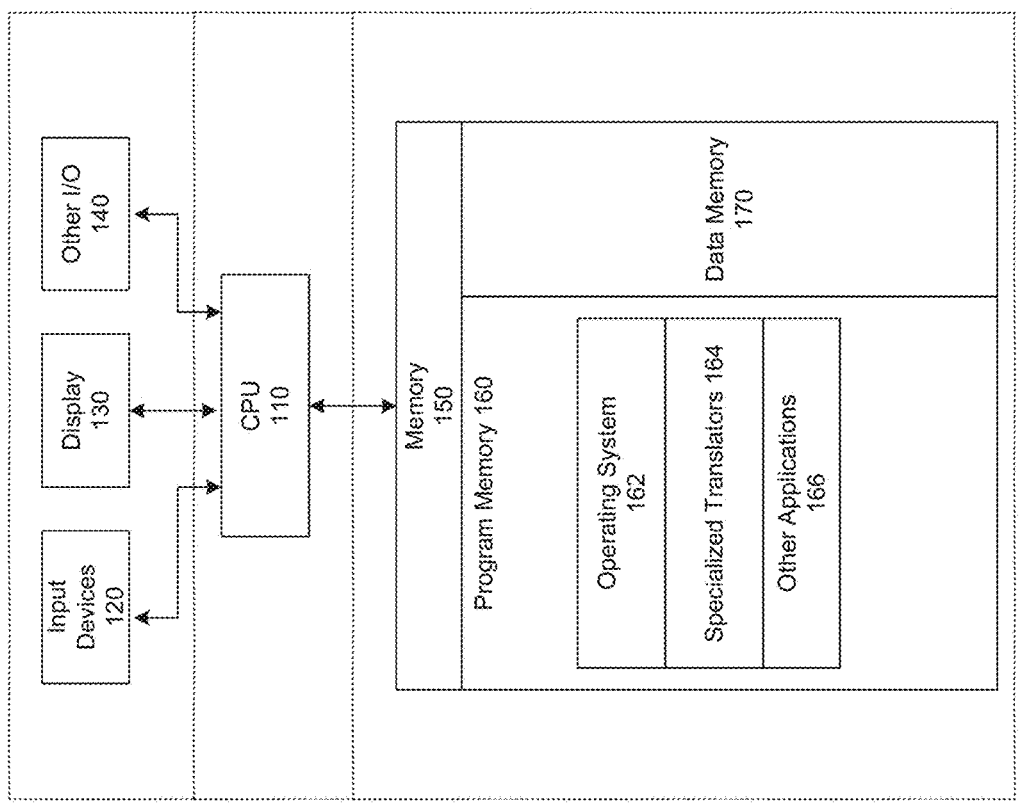
FIG. 1 is a block diagram illustrating an overview of devices on which some implementations of the disclosed technology can operate.

Implementations of specialized natural language processing engines, such as specialized machine translation engines, that include author-specific or reader-specific language models are described herein. When applying a specialized machine translation engine to a content item to be translated, a translation model portion of the specialized machine translation engine can generate multiple translations of the content item. Applying the specialized machine translation engine can include scoring each of the multiple translations using a standard language model, an author-specific language model, a reader-specific language model, or any combination thereof. A combination of these scores, computed for each of the translations, can be correlated to the corresponding translation. The translation with the highest corresponding score can be selected as the translation of the content item. Additional details regarding applying a specialized machine translation engine are provided below in relation to FIG. 6.

A "content item," as used herein, refers to any item that utilizes a language, including text, audio, video, etc. A "language," as used herein, is a natural language, which is a human written, spoken, or signed language, e.g., English, French, Chinese, or American Sign Language. A language need not be a national language, e.g., English, but can be a dialect of or variation on a particular natural language or can be a separate representation of a language, e.g., Pinyin.

Specialized natural language processing engines can include various types of processing engines such as translation engines, spelling correction engines, grammar correction engines, Parts-of-Speech (POS) tagging engines, automatic summarization engines, coreference resolution or named entity recognition engines, natural language generation engines, relationship extraction engines, speech recognition engines, or others. In various implementations, such specialized natural language processing engines can be improved by replacing a generic language model with an author-specific or a reader-specific language model or by adjusting output of a generic language model with an author-specific or a reader-specific language model. For example, scores of multiple language models provided in the engine can be averaged. Although many of the implementations described below refer to specialized machine translation engines, other specialized natural language processing engines that include author-specific or reader-specific language models can be used in many of these implementations instead or in addition.

An author-specific language model creator can create an author-specific language model, for a particular language, that is specialized for a particular author or for a defined type of author, e.g., authors with a specified set of characteristics. The author-specific language model creator can select a set of characteristics of the author or characteristics from the defined author type, such as age, gender, education level, location, interests, religion, political affiliation, social media activity, etc. The author-specific language model creator can obtain content created by the author and by authors with the identified characteristics. If an insufficient amount of content is obtained, the author-specific language model creator can broaden search parameters by removing characteristics or expanding characteristic ranges. Once enough content has been obtained, the author-specific language model creator can use it to train an author-specific language model. Additional details regarding generating an author-specific language model are provided below in relation to FIG. 4.

A reader-specific language model creator can create a reader-specific language model, for a particular language, that is specialized for a particular reader. The reader-specific language model creator can obtain content created by or accessed by the reader and use it as training data for a reader-specific language model. If the reader has not created enough content to train a language model, the reader-specific language model creator can augment this training data with content created or accessed by other similar users, such as those that share a defined set of characteristics. Once enough content has been obtained, the reader-specific language model creator can use it to train a reader-specific language model. Additional details regarding generating a reader-specific language model are provided below in relation to FIG. 5.

A "language snippet" or "snippet," as used herein, is a digital representation including one or more words or character groups. A snippet can be a representation of a content item or language from a content item (e.g., one or more images, videos, or audio files), language from or associated with a content item, or any other context or metadata associated with the content item (e.g., object, location, or person identification; image, video, or audio characteristics; structured data provided by an originator of the content item; or any other information associated with the content item). While the description below refers to snippets when performing natural language processing on content items, other language formats can be used, such as audio or video language representations.

Several implementations are discussed below in more detail in reference to the figures. Turning now to the figures, FIG. 1 is a block diagram illustrating an overview of devices 100 on which some implementations of the disclosed technology may operate. The devices can comprise hardware components of a device 100 that can build or use machine translation engines specialized for one or both of a content item author or content item reader. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 has access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, specialized translators 164, and any other application programs 166. Memory 150 can also include data memory 170 that can include identifications of users (i.e. authors or readers) associated with identified characteristics, correlations between content items and authors, correlations between content items and readers, language models, translations, threshold and other configuration data, settings, user options or preferences, etc., which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, and the like.

Figure 2:
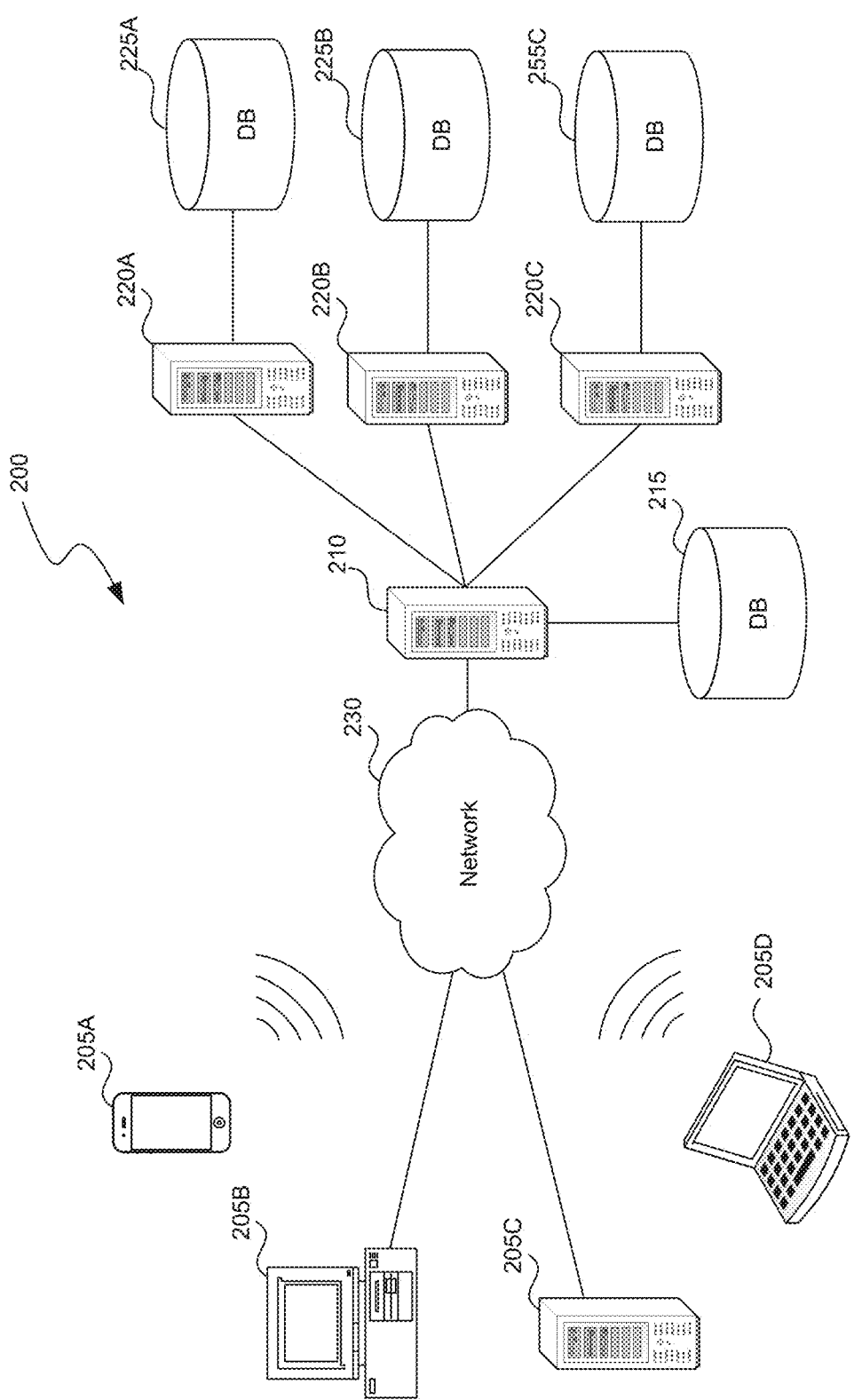
FIG. 2 is a block diagram illustrating an overview of an environment in which some implementations of the disclosed technology can operate.

FIG. 2 is a block diagram illustrating an overview of an environment 200 in which some implementations of the disclosed technology may operate. Environment 200 can include one or more client computing devices 205A-D, examples of which can include device 100. Client computing devices 205 can operate in a networked environment using logical connections 210 through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as identifications of users (i.e. authors or readers) associated with identified characteristics, correlations between content items and authors, correlations between content items and readers, language models, translations, etc. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. The client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
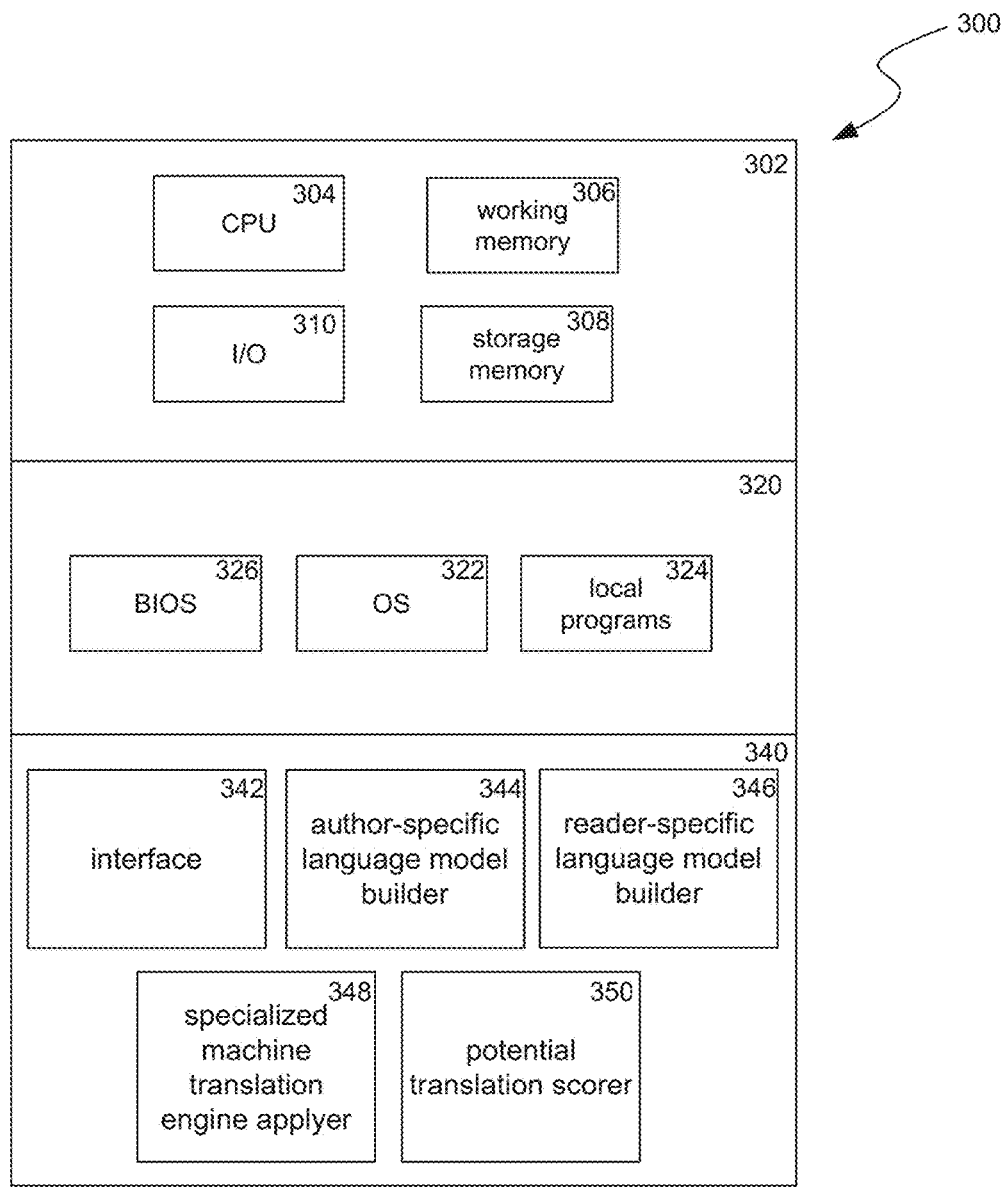
FIG. 3 is a block diagram illustrating components which, in some implementations, can be used in a system employing the disclosed technology.

FIG. 3 is a block diagram illustrating components 300 which, in some implementations, can be used in a system implementing the disclosed technology. The components 300 include hardware 302, general software 320, and specialized components 340. As discussed above, a system implementing the disclosed technology can use various hardware including central processing units 304, working memory 306, storage memory 308, and input and output devices 310. Components 300 can be implemented in a client computing device such as client computing devices 205 or on a server computing device, such as server computing device 210 or 220.

General software 320 can include various applications including an operating system 322, local programs 324, and a BIOS 326. Specialized components 340 can be subcomponents of a general software application 320, such as local programs 324. Specialized components 340 can include author-specific language model builder 344, reader-specific language model builder 346, specialized machine translation engine applier 348, potential translation scorer 350, and components which can be used for controlling and receiving data from the specialized components, such as interface 342. In some implementations, components 300 can be in a computing system that is distributed across multiple computing devices or can include an interface to a server-based application.

An author-specific language model builder 344 can be configured to generate a language model that is specific to a particular content author or type of author. When a specialized natural language processing engine, such as a specialized machine translation engine, operates on content items created by this author, or similar types of authors, the results can often be improved by conforming the processing to linguistic patterns of the author or to linguistic patterns of the type of author. For example, a snippet from a content item with the phrase "yo dog" could be translated into a phrase meaning "hello friend" where the content item author typically uses the word "dog" to refer to friends, as opposed to a more literal translation referring to a K-9 for a veterinarian who has a history of posting comments referring to K-9s. Author-specific language model builder 344 can build an author-specific language model by identifying a set of author characteristics for a particular author or type of author. Author-specific language model builder 344 can then obtain snippets generated by the particular author or authors sharing all the identified characteristics, such as through interface 342.

If the obtained snippets do not include enough data to build a language model, author-specific language model builder 344 can widen the range of eligible snippets by removing some characteristics from the set or broadening the characteristic ranges. For example, if the characteristic set includes females living in San Francisco that are 22-24 years old, the characteristic set can be broadened to include people living in the Bay Area that are 21-26 years old. Author-specific language model builder 344 can then augment the obtained set of snippets by obtaining additional snippets generated by authors sharing all the updated set of characteristics. This process of widening the characteristic parameters and obtaining additional snippets can be repeated until enough author-specific data is obtained to train a language model. Author-specific language model builder 344 can then use the author-specific data to build an author-specific language model, which can be returned, such as through interface 342.

A reader-specific language model builder 346 can be configured to generate a language model that is specific to a particular reader. When a specialized natural language processing engine operates on a content item that is for presentation to a particular reader, the results can often be improved by conforming the processing to linguistic patterns of the reader. For example, a reader visiting a social media website may view a content item originally in Spanish that includes the snippet "Hola amigo!" The reader may be an English speaker and thus various potential translations of the snippet may include "Hello friend!" and "Hello mate!" The reader may be an Australian, and thus much of the content he has created or read may have used the word "mate" when referring to a friend. Thus, a reader-specific language model may select the "Hello mate!" translation for this reader as opposed to other translations that use other words for friend.

Reader-specific language model builder 346 can build a reader-specific language model by identifying content created or consumed by a particular reader. Users generally consume more content than they produce and thus content identified as having been consumed by a particular reader is often enough to build a language model for that reader. However, if this identified content is not enough to build a language model, reader-specific language model builder 346 can obtain content authored or consumed by readers with similar characteristics, as discussed above in relation to author-specific language model builder 344. Once enough reader-specific data is obtained to train a language model, reader-specific language model builder 346 can then use the reader-specific data to build a reader-specific language model, which can be returned, such as through interface 342.

A specialized machine translation engine applier 348 can be configured to translate a snippet received through interface 342 into a different output language. A specialized machine translation engine applier 348 can perform this translation, in part, by applying an author-specific language model, a reader-specific language model, or both. In the example above with the snippet from a content item with the phrase "yo dog," the translations meaning "hello friend" and "hey dog" can each be generated by various translation models, e.g. models trained in different domains, such as the translation models discussed in commonly assigned U.S. patent application Ser. No. 14/559,540, entitled "Mining Multi-Lingual Data." The author can be determined to be a 25 year old male. A language model built specifically for authors that are males between ages 21-28 can be used to identify the "hello friend" translation as the more likely intended meaning for this type of author. In some implementations, components 300 can include alternate specialized natural language processing engine appliers instead of specialized machine translation engine applier 348. For example, such specialized natural language processing engines can include a specialized correction engine or a specialized POS tagging engine.

A specialized machine translation engine applier 348 can perform a translation of a received snippet by first applying one or more translation models to generate multiple potential translations of the snippet. In some implementations, the translation models can be trained for different domains. For example, one translation model may be trained to generate translations for news feeds on a social media website while another translation model may be trained to generate translations for posts by users or a social media website. The specialized machine translation engine applier 348 can then apply one or more language models to each translation to obtain a score. This score can be generated by potential translation scorer 350. The specialized machine translation engine applier 348 can select, as a translation of the received snippet, the potential translation with the highest score. This translation can be returned through interface 342.

A potential translation scorer 350 can be configured to use one or more language models to generate a score for a potential translation. These language models can include a general language model, a reader-specific language model, an author-specific language model, domain-specific language models, or others. Where the potential translation scorer 350 applies more than one language model, the score for a translation can be a combination of the results of each translation model. In some implementations, this combination is an average of various score results of each translation model. In some implementations, this combination is computed by weighting a score of the general language model with score results of other applied translation models. This score can be returned to specialized machine translation engine applier 348.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc.

Figure 4:
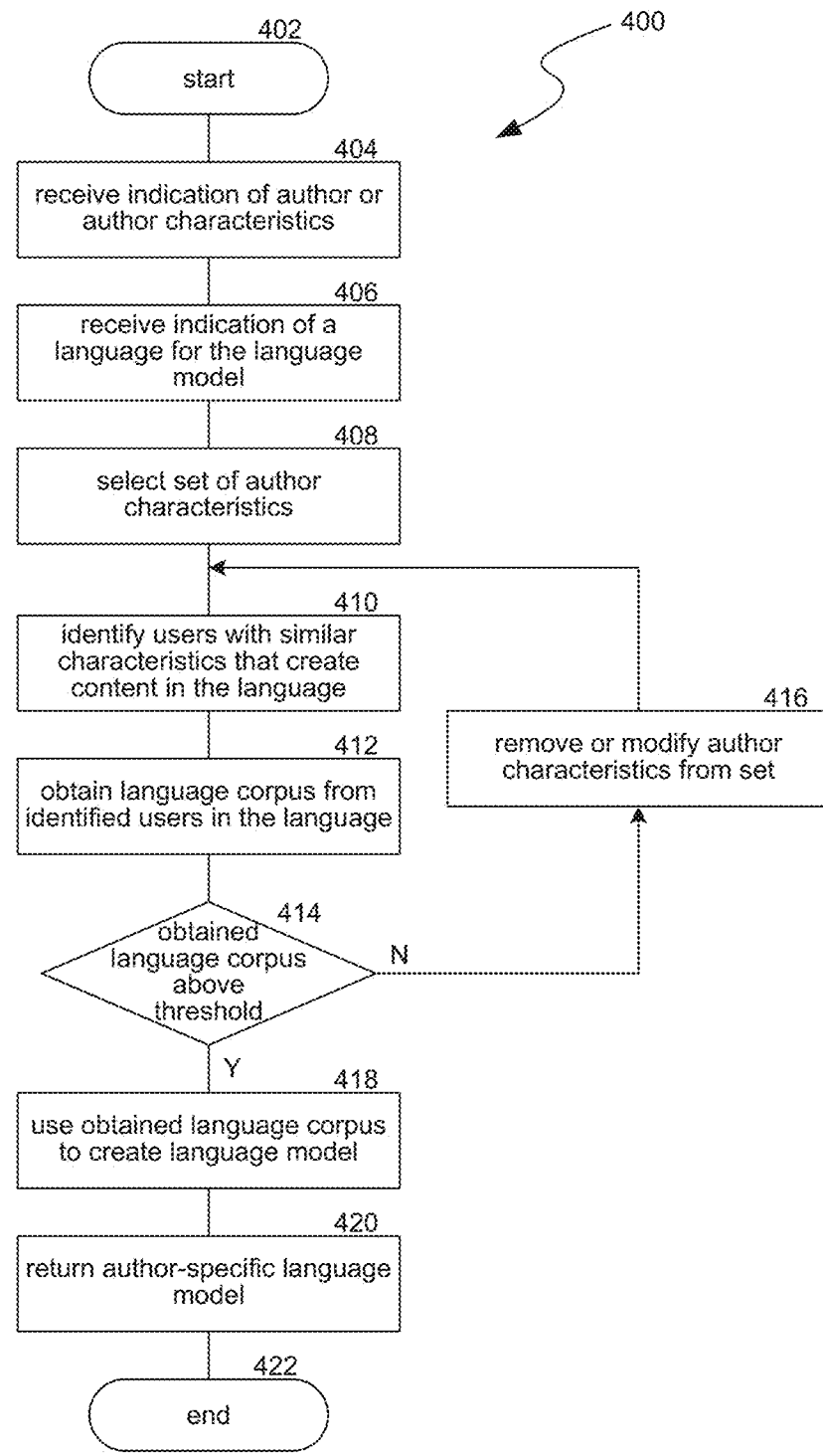
FIG. 4 is a flow diagram illustrating a process used in some implementations for generating an author-specific language model.

FIG. 4 is a flow diagram illustrating a process 400 used in some implementations for generating an author-specific language model. An "author," as used herein, can be any user who produces content. Process 400 begins at block 402 and continues to block 404. In some implementations, process 400 can be performed in response to a request for a translation of a snippet. In some implementations, process 400 can be performed in response to the creation of a snippet. In some implementations, process 400 can be performed in response to another trigger, such as on a periodic basis, once a specific author or author type has been identified as producing a threshold amount of content, once a specific author or author type has been identified as producing content that is likely to be viewed or translated a threshold amount, etc.

At block 404, process 400 can receive an indication of an author or of author characteristics. In some implementations, process 400 can generate an author-specific language model for a particular author, such as for each user of a system, for users who are determined to be likely to have their content items translated, or for users who are determined to be likely have their content items translated enough times that a high-quality translation is desirable. For example, process 400 can be performed for celebrity users, users who are identified as having many friends or followers, or users that are associated with other users that typically read content in a language other than the language that user typically produces content in. In some implementations, process 400 can generate an author-specific language model for a particular type of author, such as for identified types of authors that are determined to be likely to have their content items translated or for types of users who are determined to be likely to have their content items translated enough times that a high-quality translation is desirable. For example, process 400 can be performed to generate separate author-specific language models for authors in the age ranges 13-18, 19-23, and 24-29 because users in these age ranges are determined to create the most content items.

At block 406, process 400 can receive an indication of a language for which process 400 is to create a language model. At block 408, process 400 can select a set of author characteristics. In some implementations, the author characteristics can be those that are identified at block 404. In some implementations, the author characteristics can be characteristics of the user identified at block 404. In various implementations, characteristics included in the set selected at block 408 can include one or more of: age, gender, education level, location, interests, religion, political affiliation, social media statistics, technology used, friend groups, or any combination thereof. For example, location data can include country codes, IP addresses, identified cities, identified regions, user-specified areas, etc. As another example, interests can be based on the user's history of "liking" content items, a user's posts, interactions with a certain type of page, user-specified interests, a history of content viewed by a user, etc. As a further example, social media statistics can include a registration date, a user's age at registration, a user's followers or follower count, a user's friends or friend count, typical login times, average amount of time spent using the site, etc.

At block 410, process 400 can identify users with the characteristics identified at block 408 and that have created content in the language identified at block 406. In some implementations, blocks 408 and 410 are only performed after process 400 determines, at block 414, that there is insufficient content created by the user indicated at block 404 to create a language model, and content created by similar users is needed to be able to train an author-specific language model.

At block 412, process 400 can obtain a language corpus created in the language for the model identified at block 406. A "language corpus," as used herein, is a collection of words or phrases; a language corpus can be obtained from various sources such as literature, news articles, wiki sources, social media posts, etc. If this is not the first iteration of the loop between blocks 410-416, part of the obtained corpus can be from the operations at block 412 of a previous iteration of this loop. Process 400 can obtain this language corpus first from the user identified at block 404 and then from the additional users identified at block 410. In some implementations, the obtained language corpus can include only content authored by these users. In some implementations, the obtained language corpus can include additional content, such as content the identified users have viewed, shared, liked, etc.

At block 414, process 400 can determine whether the language corpus obtained at block 412 is sufficiently large or sufficiently varied to train an author-specific language model. A language corpus can be determined to be sufficiently varied when it has coverage of a language that is above a threshold value. "Coverage," as used herein, refers to a value indicating how many of the words or a language are present in a word or phrase set, such as a defined language corpus. In some implementations, determining whether a corpus is sufficiently large or varied can be accomplished by assigning a size or language coverage score to the corpus and comparing either or both scores to a corresponding threshold. If the score is above the threshold, process 400 can continue to block 418. If the score is not above the threshold, process 400 can continue to block 416.

At block 416, process 400 can remove or modify characteristics from the set of characteristics identified at block 408. Removing characteristics from the set can increase the number of users that match those characteristics. Modifying characteristics can include broadening the parameters of those characteristics, such as by modifying an age range to include additional ages or a location parameter to include additional regions. This type of modification can increase the number of users that match the set of characteristics. Process 400 can repeat the loop between blocks 410-416 until the obtained language corpus is sufficiently large or varied to build an author-specific language model.

At block 418, process 400 can use the obtained language corpus to create an author-specific language model. In some implementations, an author-specific language model can provide a prediction or probability distribution, for a given one or more words, which one or more words will come next. This probability distribution can be based on an analysis of word sequences that appear in the obtained language corpus. Process 400 then continues to block 420 where the author-specific language model can be returned. Process 400 continues to block 422, where it ends.

Figure 5:
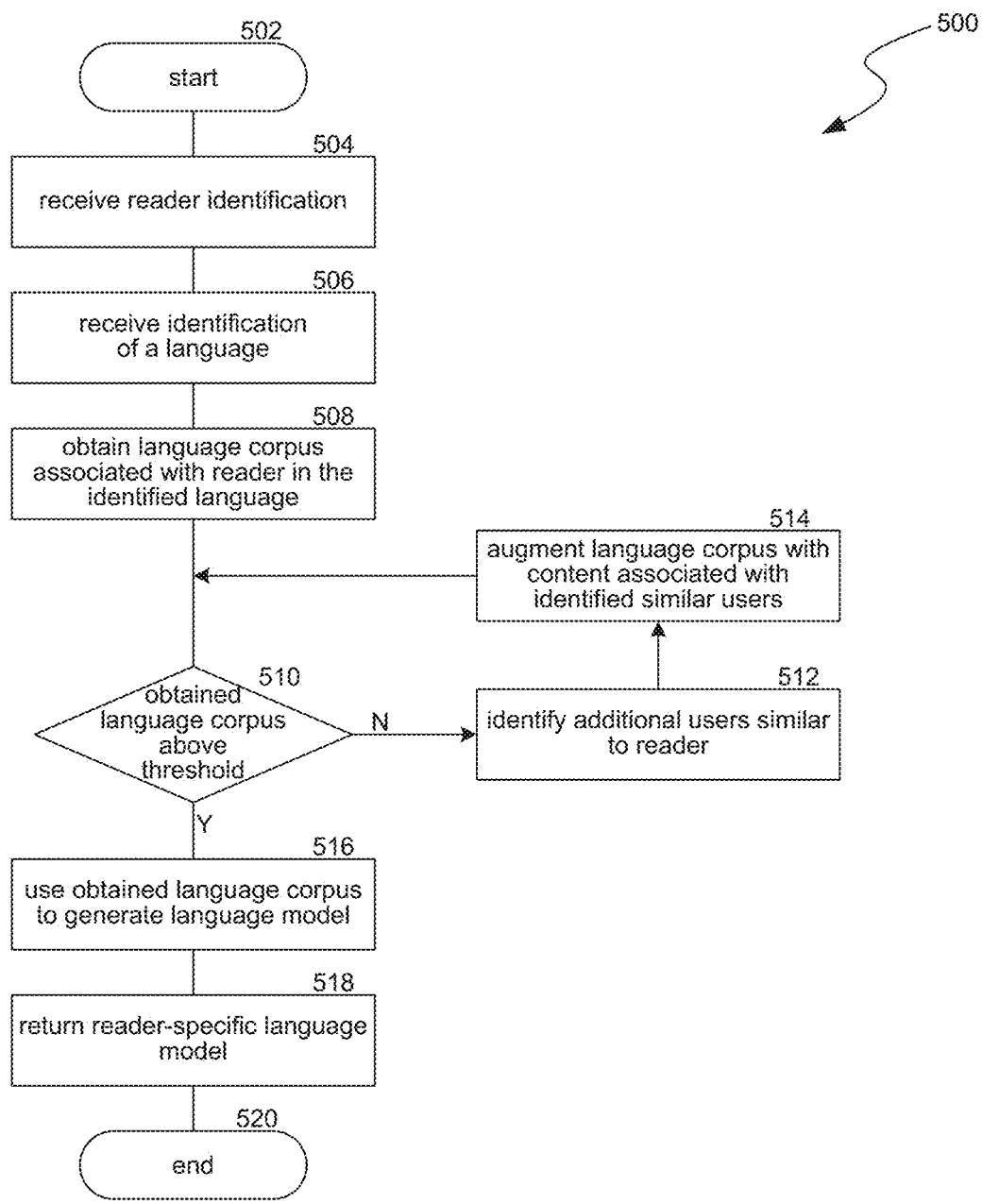
FIG. 5 is a flow diagram illustrating a process used in some implementations for generating a reader-specific language model.

FIG. 5 is a flow diagram illustrating a process 500 used in some implementations for generating a reader-specific language model. A "reader," as used herein, can be any user who consumes content. Process 500 begins at block 502 and continues to block 504. In some implementations, process 500 can be performed in response to a request for a translation of a snippet. In some implementations, process 500 can be performed in response to the registration of a reader with a social media system or upon the reader reaching a particular level of activity, such as having viewed a number of items, having a number of friends, having been registered with a website for an amount of time, having a number of followers or following a number of other users, having a threshold login frequency or duration with a website, etc.

At block 504, process 500 can receive an identification of a reader or characteristics of a type of reader. In some implementations, process 500 can generate a reader-specific language model for a particular reader, such as for each user of a system or for users who are determined to request content items translated enough times that a reader-specific translation engine is warranted. For example, process 500 can be performed for users who have many friends that are determined to speak languages other than languages determined to be known by that reader. Additional details regarding determining which languages a user is facile with are provided in commonly assigned U.S. patent application Ser. No. 14/302,032, entitled "Classifying Languages for Objects and Entities." In some implementations, process 500 can generate a reader-specific language model for a particular type of reader. For example, process 500 can be performed to generate separate reader-specific language models for readers in the age ranges 13-18, 19-23, and 24-29, because users in these age ranges are determined to view the most content items.

At block 506, process 500 can receive an identification of a language for the reader-specific language model process 500 is to create. In some implementations, the identified language can be the output language of a translation that has been requested. In some implementations, the identified language can be a language determined to be known by the user identified at block 504. In some implementations, process 500 can be performed multiple times to create multiple reader-specific language models for users for different output languages.

At block 508, process 500 can obtain a language corpus that is written by the reader identified at block 504 and that is written in the output language. In some implementations, instead of or in addition to content items written by the user, process 500 can include in the language corpus content items in the output language that have been viewed by the reader identified at block 504. In some implementations, instead of or in addition to content items written by the user, process 500 can include in the language corpus content items in the output language that have been interacted with by the reader identified at block 504. For example, an interaction with a content item can be the user specifically selecting a link associated with the content item for viewing, liking the content item, following an author of the content item, etc. In some implementations, which content items are viewed or interacted with can be tracked on a per-user basis by a social media website.

At block 510, process 500 can determine whether the language corpus obtained at block 508 is sufficiently large or sufficiently varied to build a language model. In some implementations, determining whether a corpus is sufficiently large or varied can be accomplished by assigning a size or language coverage score to the corpus and comparing either or both scores to a corresponding threshold. If the score is above the threshold, process 500 can continue to block 516. If the score is not above the threshold, process 500 can continue to block 512.

At block 512, process 500 can identify additional readers with characteristics similar to the reader identified at block 504 and that have created or viewed content in the language identified at block 506. In some implementations, identifying additional readers can comprise removing or modifying identified reader characteristic requirements to increase the number of users that match those characteristics. Modifying characteristics can include broadening the parameters of those characteristics, such as by modifying an age range to include additional ages or a location parameter to include additional regions.

At block 514, process 500 can augment the language corpus obtained at block 508 with additional content items written by, viewed by, or interacted with by the readers identified at block 514. Process 500 can repeat the loop between blocks 510-514 until the obtained language corpus is sufficiently large or varied to build a reader-specific language model.

At block 516, process 500 can use the obtained language corpus to create a reader-specific language model. In some implementations, a reader-specific language model can provide a prediction or probability distribution, for a given one or more words, which one or more words will come next. This probability distribution can be based on an analysis of word sequences that appear in the obtained language corpus. Process 500 then continues to block 518 where the reader-specific language model can be returned. Process 500 continues to block 520, where it ends.

Figure 6:
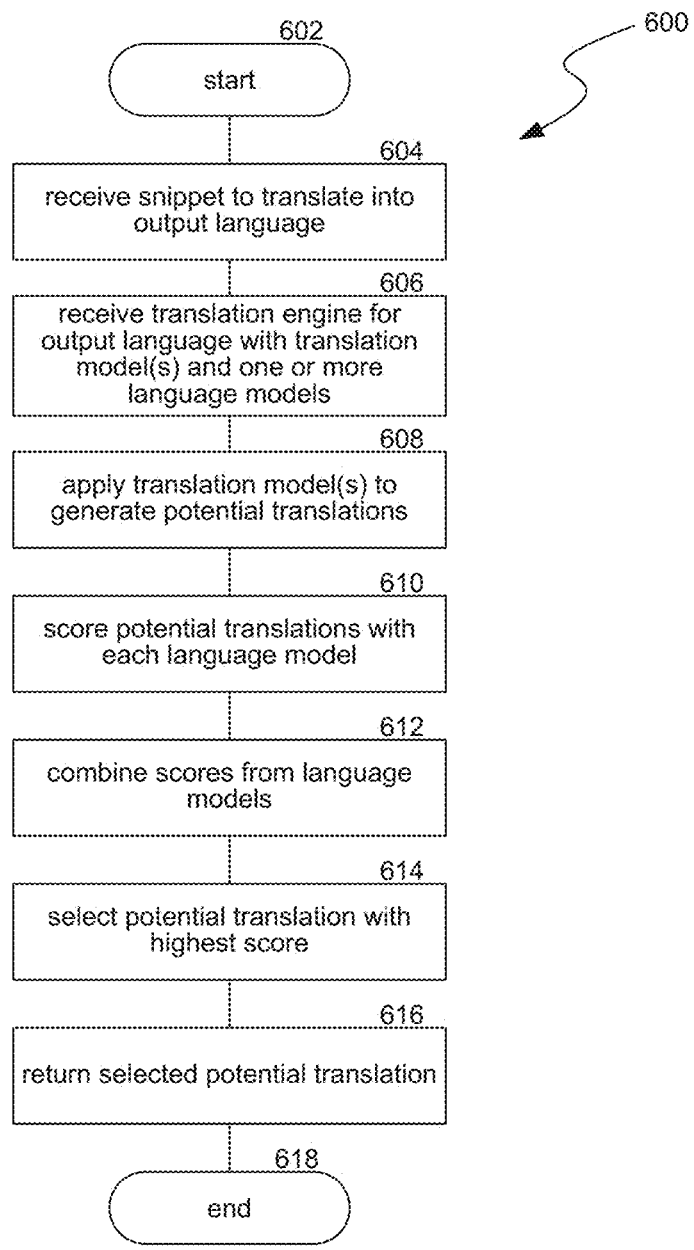
FIG. 6 is a flow diagram illustrating a process used in some implementations for applying a specialized machine translation engine.

FIG. 6 is a flow diagram illustrating a process 600 used in some implementations for applying a specialized machine translation engine. Process 600 begins at block 602 and continues to block 604. At block 604, process 600 can receive a snippet to translate. The snippet can be written in a source language and can be translated into an output language.

At block 606, process 600 can receive a specialized translation engine for the output language. A specialized machine translation engine can include one or more translation models. A specialized machine translation engine can also include one or both of one or more author-specific language model and one or more reader-specific language models. A specialized machine translation engine can also include additional language models, such as one or more generic language models or one or more domain-specific language models.

At block 608, process 600 can apply the translation models of the specialized translation engine received at block 606 to the snippet received at block 604 to generate one or more potential translations of the snippet in the output language. Applying a translation model can comprise identifying words or phrases in the snippet that match rules in the translation model, where the rules define corresponding words or phrases in the output language. A potential translation can then be created with the corresponding words or phrases from the matched rules.

At block 610, process 600 can score the potential translations generated at block 608. Scoring a selected potential translation can include applying one or more of the language models included in the specialized translation engine received at block 606 to the selected potential translation. Applying a language models to a potential translation can include iterating through phrases of the potential translation to determine, for a particular phrase, the probability that a second part of the particular phrase follows a first part of that particular phrase in the output language. These probabilities can be computed using probability distributions of a language model. In author-specific language models, these probability distributions can indicate the likelihood of an author or author type using a particular second phrase following a particular first phrase. In reader-specific language models, these probability distributions can indicate how familiar a reader or reader type is with seeing a particular second phrase following a particular first phrase. In some implementations, multiple scores can be generated for a selected potential translation by applying multiple language models from the specialized translation engine received at block 606.

At block 612, a combined score can be generated for one or more of the potential translations from one or more scores generated at block 610 for that potential translation. For example, the combined score can be an average of scores produced by two or more of: a generic language model, an author-specific language model, a reader-specific language model, or any combination thereof. As another example, the combined score can be computed by weighting a score produced by a generic language model with one or both of scores produced by an author-specific language model or a reader-specific language model. In some implementations, only one score is produced by process 600 for a selected potential translation at block 610, in which case the combined score for that selected potential translation can be the score generated at block 610.

At block 614, the potential translation with the highest combined score can be selected as the translation of the snippet received at block 604. At block 616, the selected the translation of the snippet can be returned. Process 600 can then continue to block 618, where it ends.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C, etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references referred to above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for generating an author-specific language model, comprising:
   receiving an indication of an author or author type;
   selecting a set of characteristics of the indicated author or author type;
   identifying one or more users who are associated with characteristics corresponding to the selected set of characteristics;
   obtaining an author-specific language corpus comprising snippets authored by the identified one or more users;
   iteratively, until determining that the author-specific language corpus has coverage, for a language, that is above a threshold level:
      in response to determining that the author-specific language corpus has coverage, for the language, that is below the threshold level:
         modifying one or more characteristics of the set of characteristics, or removing the one or more characteristics from the set of characteristics, wherein the modifying or removing causes the set of characteristics to match one or more additional users;
         identifying the one or more additional users that are associated with characteristics corresponding to the modified set of characteristics; and
         augmenting the author-specific language corpus with snippets authored by the identified one or more additional users; and
   creating the author-specific language model based on the author-specific language corpus; wherein the author-specific language model is used to perform a language translation of a content item.

2. The method of claim 1 further comprising:
   computing probabilities based on occurrences of phrases in the author-specific language corpus, each probability indicating a likelihood of a second part of a phrase occurring given a first part of the phrase;
   wherein computing probabilities based on occurrences of phrases in the author-specific language corpus uses the augmented author-specific language corpus; and
   wherein creating the author-specific language model is based on the computed probabilities.

3. The method of claim 2, wherein the iterations further continue until determining that the author-specific language corpus is sufficiently large.

4. The method of claim 1, wherein the set of characteristics of the indicated author comprise one or more of:
   age;
   education level;
   gender;
   location; or
   any combination thereof.

5. The method of claim 1, wherein the snippets authored by the identified one or more users comprise social media posts authored by the identified one or more users.

6. The method of claim 1, wherein the indication of the author or author type indicates an author type identified as creating social media posts that are likely to be popular or are likely to receive a number of translation requests above a threshold.

7. The method of claim 1,
   wherein the indication of the author or author type indicates a particular author identified as writing in a first language; and
   wherein the particular author is identified as having a threshold number of friends who have been identified as reading in a second language different from the first language.

8. A non-transitory computer-readable storage medium storing instructions that, when executed by a computing system, cause the computing system to perform operations for generating a reader-specific language model, the operations comprising:
   receiving an indication of a user who is a reader;
   receiving an identification of a language for the reader-specific language model;
   obtaining a reader-specific language corpus comprising snippets associated with the reader;
   identifying one or more users that share a specified set of characteristics with the reader;
   augmenting the obtained reader-specific language corpus with snippets associated with the identified one or more additional users;
   iteratively, until determining that the reader-specific language corpus is sufficient to build the reader-specific language model:
      modifying one or more characteristics of the set of characteristics, or remove the one or more characteristics from the set of characteristics, wherein the modifying or removing causes the set of characteristics to match one or more additional users;
      identifying the one or more additional users that are associated with characteristics corresponding to the modified set of characteristics; and
      augmenting the reader-specific language corpus with snippets associated with the identified one or more additional users; and
   creating the reader-specific language model based on the reader-specific language corpus; wherein the reader-specific language model is used to perform a language translation of a content item.

9. The non-transitory computer-readable storage medium of claim 8 wherein the operations further comprise:
   computing probabilities based on occurrences of phrases in the reader-specific language corpus, each probability indicating a likelihood of a second part of a phrase occurring given a first part of the phrase;
   wherein computing probabilities based on occurrences of phrases in the reader-specific language corpus uses the augmented reader-specific language corpus; and
   wherein creating the reader-specific language model is based on the computed probabilities.

10. The non-transitory computer-readable storage medium of claim 8, wherein determining that the obtained reader-specific language corpus is insufficient to create the language model is based on a determination that the obtained reader-specific language corpus is insufficiently large or has insufficient language coverage.

11. The non-transitory computer-readable storage medium of claim 8, wherein the different set of characteristics comprise one or more of:
   age;
   education level;
   interests;
   friend count;
   number of posts;
   gender; or
   any combination thereof.

12. The non-transitory computer-readable storage medium of claim 8, wherein obtaining the reader-specific language corpus comprising snippets associated with the reader is performed by:
  selecting snippets viewed by the reader;
  or selecting snippets liked by the reader.

13. The non-transitory computer-readable storage medium of claim 8, wherein obtaining the reader-specific language corpus comprising snippets associated with the reader is performed by selecting snippets authored by the reader.

14. A system for generating a specialized language model, the system comprising:
  one or more processors;
  an interface configured to:
    receive an indication of a particular user or user type; and
    obtain an user-specific language corpus comprising snippets associated with an identified one or more users, wherein the identified one or more users were identified due to having a selected set of characteristics in common with the particular user or user type; and
  a memory storing instructions configured to, when executed by the one or more processors, cause the system to:
    iteratively, until determining that the user-specific language corpus is sufficient to build the specialized language model:
      modify one or more characteristics of the set of characteristics, or remove the one or more characteristics from the set of characteristics, wherein the modifying or removing causes the set of characteristics to match one or more additional users;
      identify the one or more additional users that are associated with characteristics corresponding to the modified set of characteristics; and
      augment the user-specific language corpus with snippets associated with the identified one or more additional users; and
    create the specialized language model based on the user-specific language corpus; wherein the specialized language model is used to perform a language translation of a content item.

15. The system of claim 14, wherein the specialized language model is an author-specific language model.

16. The system of claim 15, wherein the received indication of the particular user or user type comprises receiving an author type identified as creating social media posts that are likely to be popular or are likely to receive a number of translation requests above a threshold.

17. The system of claim 14, wherein the specialized language model is a reader-specific language model.

18. The system of claim 14,
  wherein the specialized language model is used to create a specialized translation engine;
  wherein the specialized translation engine further comprises a general language model; and
  wherein applying the specialized translation engine comprises the language translation of the content item including computing one or more scores by:
    computing a general score by applying the general language model to a selected one of multiple potential translations of the content item; and
    adjusting the general score using results from applying the specialized language model to the selected one of the multiple potential translations.

19. The system of claim 18, wherein applying the specialized translation engine further comprises:
  selecting one, of multiple potential translations, as the translation of a snippet by selecting a potential translation associated with a highest of the computed one or more scores.

* * * * *